INVENTOR.
LEONARD A. COHEN
BY Seidel & Gonda
ATTORNEYS.

INVENTOR.
LEONARD A. COHEN

BY Seidel & Gonda

ATTORNEYS.

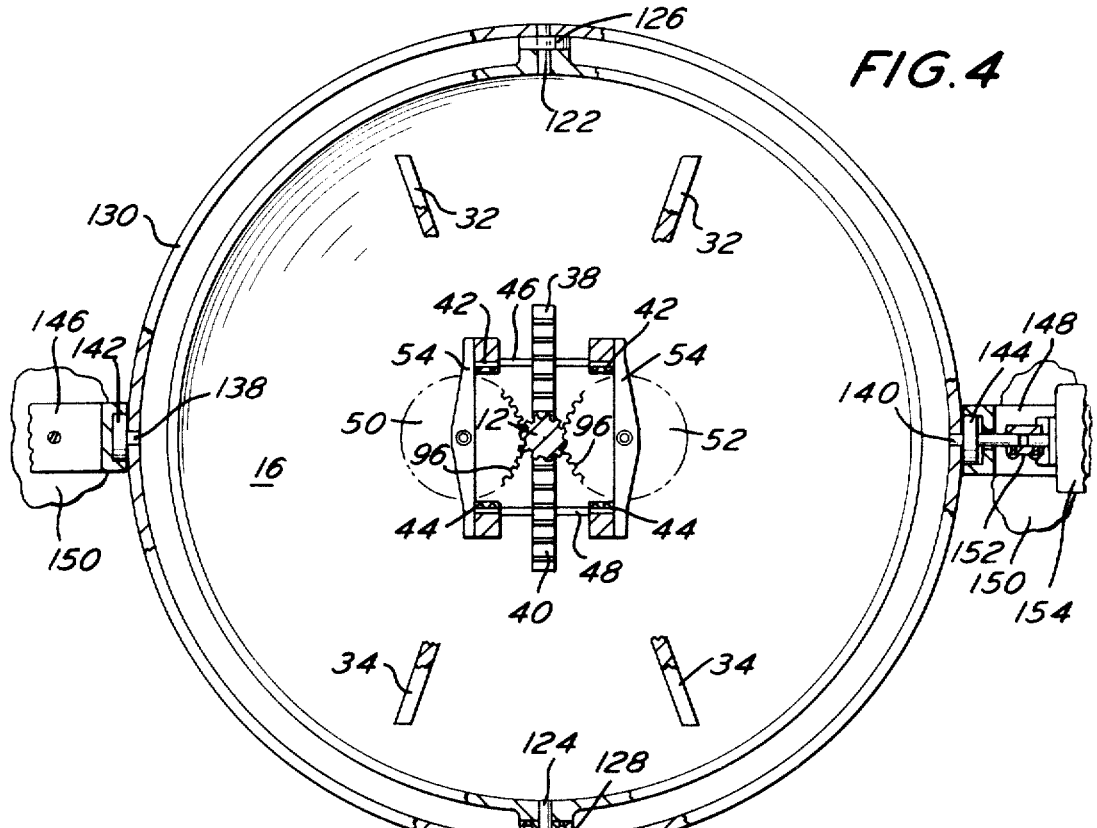
FIG. 4
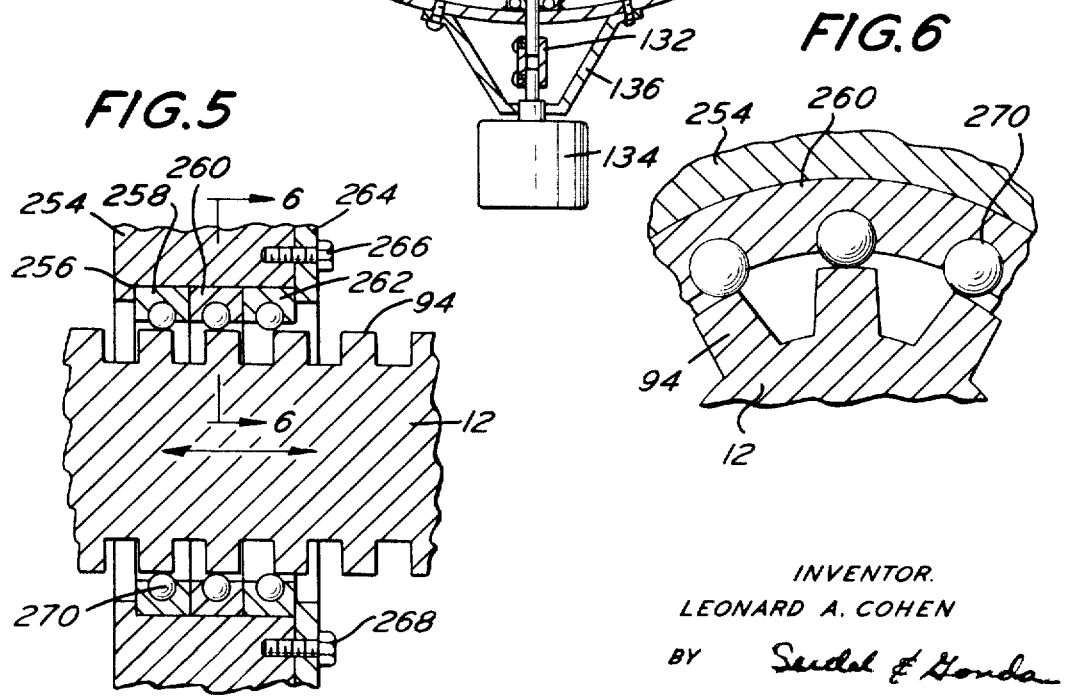
FIG. 5
FIG. 6
INVENTOR.
LEONARD A. COHEN

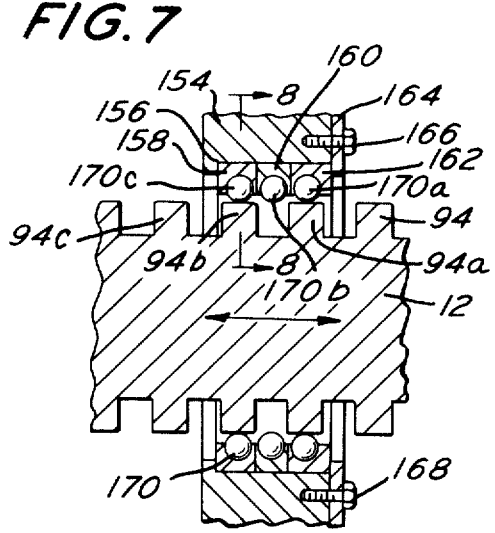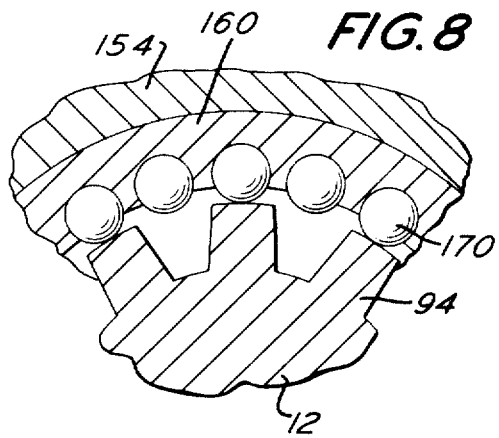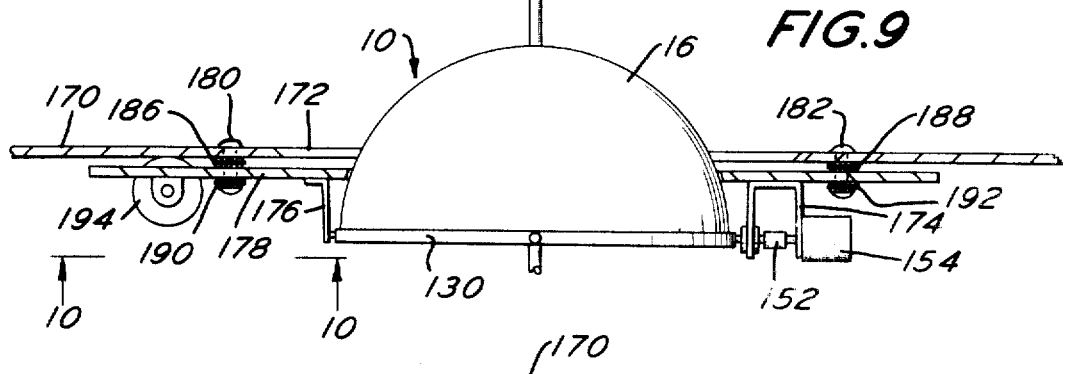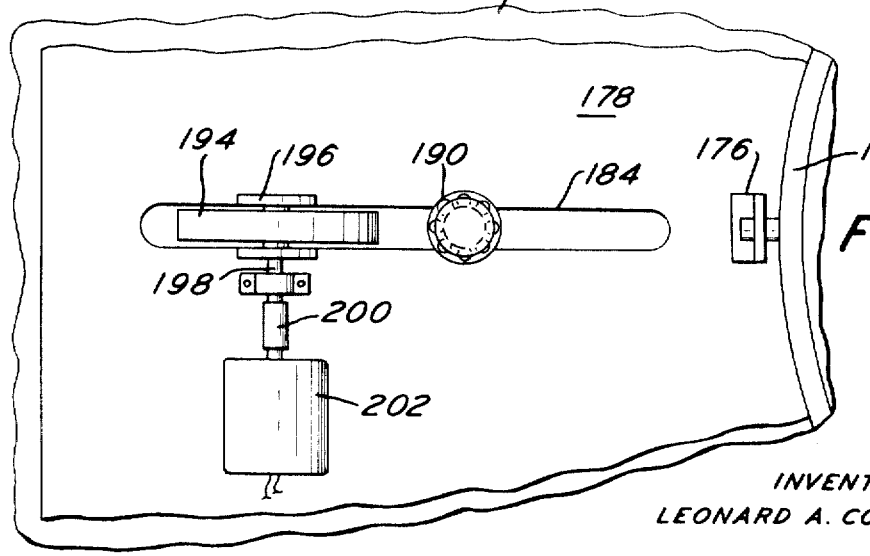

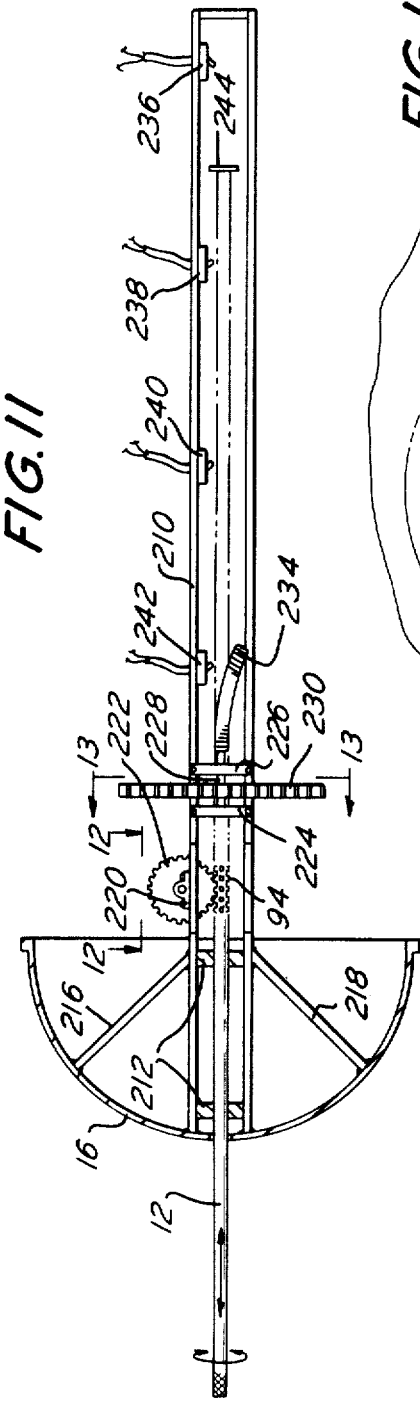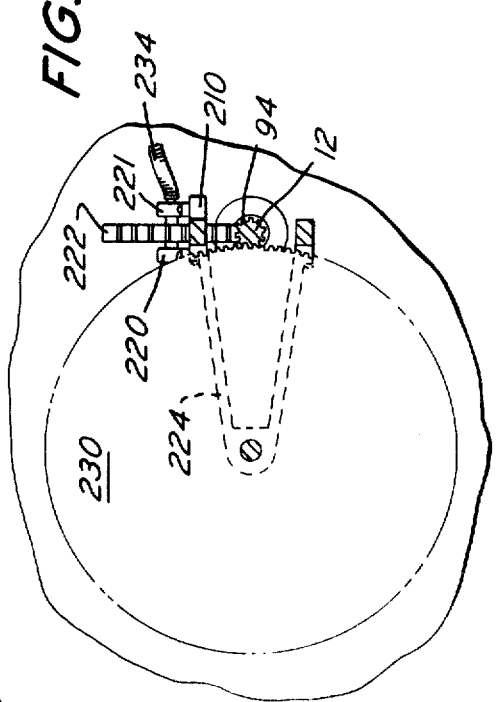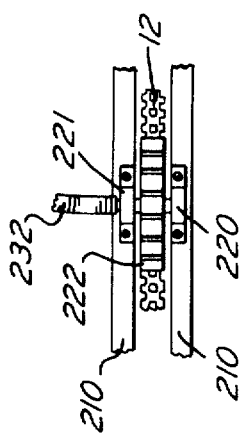

United States Patent Office 3,431,790
Patented Mar. 11, 1969

3,431,790
CONTROL MECHANISM
Leonard A. Cohen, 224 Old Lancaster Road,
Merion, Pa. 19066
Filed May 10, 1966, Ser. No. 549,065
U.S. Cl. 74—471        9 Claims
Int. Cl. G05g 9/00

ABSTRACT OF THE DISCLOSURE

A control mechanism is disclosed for unifying multiple control by a control lever which may rotate without having any reciprocatory movement and vice versa. Also, the lever may simultaneously rotate and reciprocate. Means are provided for converting various movements of the lever, which may be at least five different modes, into proportional control functions.

This invention relates to a control mechanism. More particularly, this invention relates to a control mechanism to replace conventional control knobs on the panel face of electronic instruments and the like with a more convenient and efficient apparatus for operating the control functions.

With the increase in the sophistication of electronic equipment there has been a concurrent rise in the number of control functions associated with each piece of equipment. For example, the oscilloscope, the basic tool of electronic research, has become increasingly complicated to operate. In the past, the front panel supported a relatively small number of knobs for controlling such things as the sweep frequency, brightness, horizontal and vertical position, and the like. Today the typical oscilloscope panel contains a multitude of knobs, dials and the like which function to make the instrument the important research tool that it is. Examples of the complication of electronic instruments, and for that matter all types of instruments, could be multiplied. Moreover, it is expected that the trend will continue rather than abate.

It is a general object of the present invention to provide apparatus to replace the conventional knobs on the control panel of electronic instruments with a more convenient and efficient device for operating the same. The present invention provides a manually operated control mechanism in the form of a single control arm. The control arm is capable of providing a vast variety of electronic control functions ranging from a single function to a series of combined functions. An operator manually manipulates the arm to obtain the appropriate control functions as if a wand were being manipulated. The operator can impart control functions to the electronic instrument without ever removing his hand from the control arm. This offers the advantages of rapid, convenient and efficient operation of the instrument controls because the operator does not have to search out the appropriate control knob from the multitude before him and he does not have to jump from one control knob to another with his hand. Furthermore, the operator can keep his eye on the critical overall function of the instrument, such as watching the signal trace on the screen of an oscilloscope during the instrument adjustment period. Moreover, the instrument can be operated with one hand leaving the other hand free. Another advantage of the present invention is that it inherently reduces the number of control knobs and levers on the front panel of the instrument thus presenting a simpler, neater and therefore more attractive control panel. This also facilitates the ease of operating the controls, particularly on modern instruments where miniaturization has resulted in the packing of controls into progressively smaller front panels. The result has been that the controls are oftentimes too small and too close to each other to permit efficient and comfortable use.

Most knobs on control panels are attached to shafts which operate either rotary switches, rotary potentiometers or variable resistors. In accordance with the present invention, these controls can be attached directly to the control mechanism without modifying the instrument, except to remove the knobs. The control mechanism includes appropriate electronic control shaft coupling. Thus, all wiring of the rotary control and the instrument can be preserved, except possibility for using longer connecting wires between the electronic controls and the instrument panel or chassis to provide adequate slack for various translational motions of the control arm. Thus, it is another advantage of the present invention that it can be readily incorporated into existing equipment with no change in the electronic design or mechanical layout of the instrument.

It therefore is a general object of the present invention to provide a new and unobvious control mechanism.

Another object of the present invention is to provide a new and unobvious control mechanism for combining into a single manually operated arm the control functions which are usually performed by separate controls.

Yet another object of the present invention is to provide a new and unobvious control mechanism capable of performing a plurality of control functions through the motion of a single control lever.

It is a further object of the present invention to provide a control mechanism having a single manually operated lever capable of selectively effecting one or a plurality of control functions.

Other objects will appear hereinafter.

For the purpose of illustrating the invention, there are shown in the drawings forms which are presently preferred; it being understood, however, that this invention is not limited to the precise arrangements and instrumentalities shown.

FIGURE 4 is a transverse sectional view of the control mechanism illustrated in FIGURE 1 taken along the line 4—4.

FIGURE 5 is a partial longitudinal sectional view of a bearing for the control arm that may be used in association with the apparatus illustrated in FIGURE 1.

FIGURE 6 is a partial transverse sectional view of the bearing illustrated in FIGURE 5 taken along the line 6—6.

FIGURE 7 is a partial longitudinal section of a bearing that may be used in association with the control mechanism.

FIGURE 8 is a partial transverse sectional view of the bearing illustrated in FIGURE 7 taken along the line 8—8.

FIGURE 9 is a top plan view of a modified form of the control mechanism.

FIGURE 10 is a partial front elevational view of the control mechanism illustrated in FIGURE 9 taken along the line 10—10.

FIGURE 11 is a longitudinal section of another modification of the control mechanism.

FIGURE 12 is a partial top plan view of the control mechanism illustrated in FIGURE 11 taken along the line 12—12.

FIGURE 13 is a transverse sectional view of the control mechanism illustrated in FIGURE 11 taken along the line 13—13.

Figure 1:
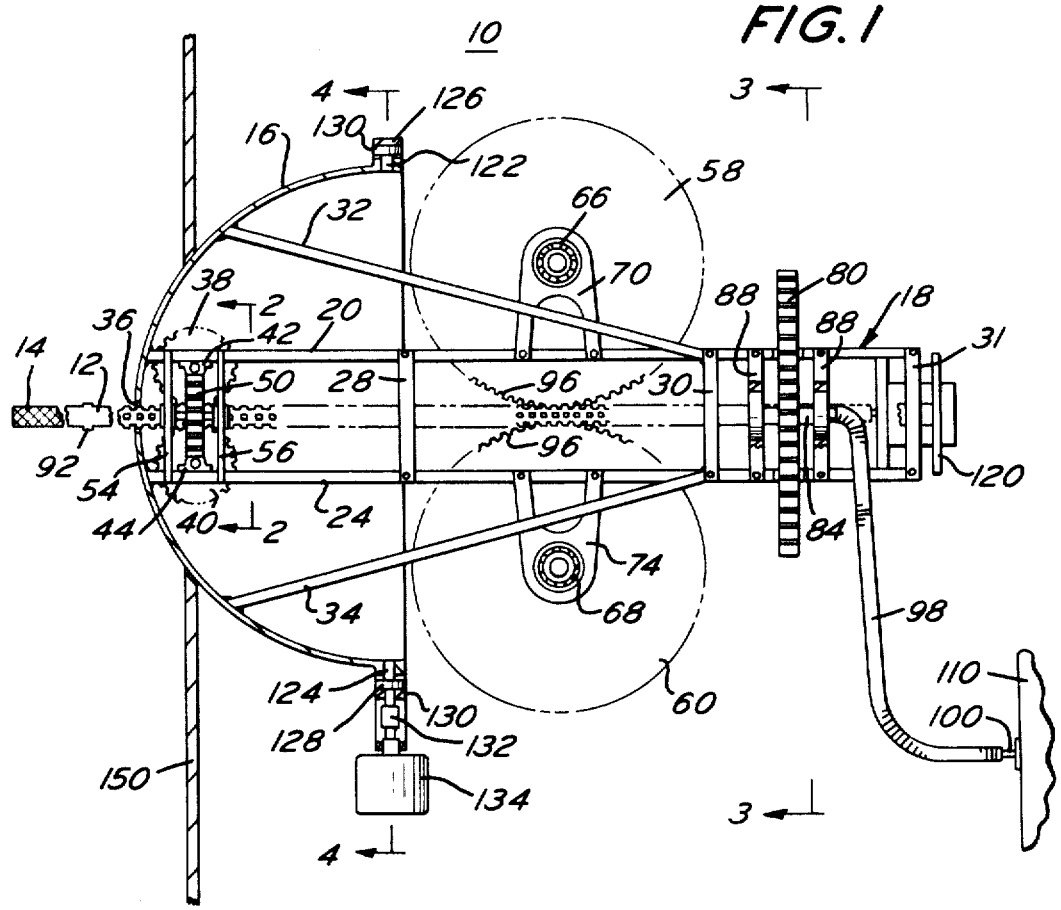
FIGURE 1 is a longitudinal sectional view of a first embodiment of the present invention.

Referring now to the drawings in detail, wherein like numerals indicate like elements, there is shown in FIGURE 1 an embodiment of the control mechanism designated generally as 10. The mechanism is shown and will be described in association with an oscilloscope. However, it should be understood that this is only exemplary of the invention. Those skilled in the art will readily recognize that the apparatus can be used for controlling other types of multifunction apparatus.

As shown, the manual control lever 12 having a knurled hand grip 14 extends through an opening in the hemisphere 16 and through a frame designated generally as 18.

The frame 18 comprises four rods 20, 22, 24 and 26 extending parallel to the lever 12 and equally spaced about the circumference thereof. The frame 18 is braced by struts such as 28 and 30 which interconnect the rods 20–26 and retain the same position. Additional struts 32 and 34 extend from struts 30 to hemisphere 16 and are connected thereto by any conventional means, such as spot welding. Hemisphere 16 is also connected to the ends of rods 20–24 by spot welds. Thus, the hemisphere 16 and frame 18 form an integral one piece mechanism.

Figure 2:
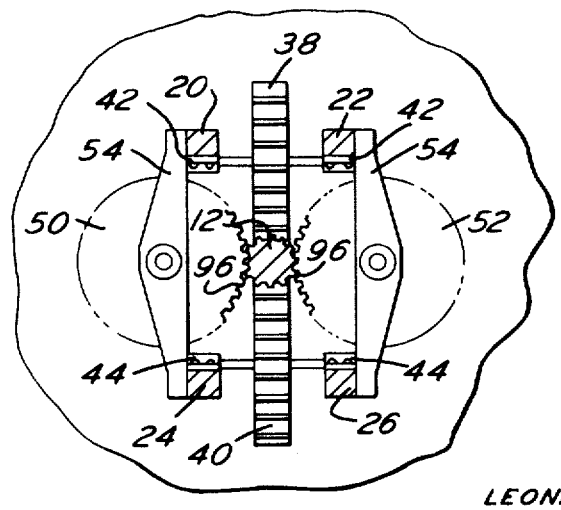
FIGURE 2 is a transverse sectional view of the apparatus illustrated in FIGURE 1 taken along the line 2—2.

The lever 12 is supported for rotary and reciprocatory motion relative to the frame 18 by two pairs of guide gears mounted on the frame 18 at a position adjacent to the opening 36 where lever 12 enters hemisphere 16. As best shown in FIGURES 1, 2 and 4, the pinion gears 38 and 40 are rotatably mounted in journals 42 and 44 supporting the shafts 46 and 48 on frame 18. Gears 38 and 40 rotate about an axis normal to the longitudinal axis of lever 12. Similarly, gears 50 and 52 are rotatably mounted in journal 54 so as to rotate about an axis parallel to the longitudinal axis of lever 12.

Figure 3:
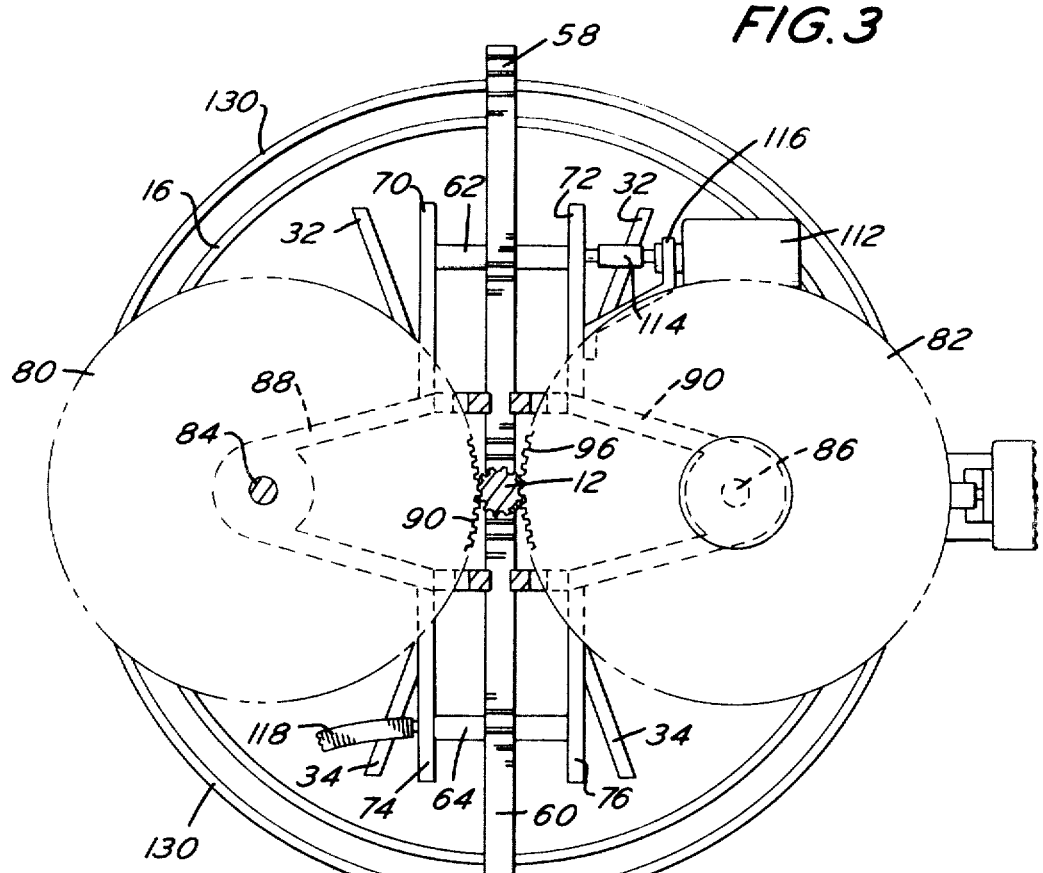
FIGURE 3 is a transverse sectional view of the apparatus illustrated in FIGURE 1 taken along the line 3—3.

Another pair of pinion gears 58 and 60 are supported by frame 18 for rotation about an axis normal to the longitudinal axis of lever 12. As shown in FIGURES 1 and 3, the gears 58 and 60 are mounted on shafts 62 and 64 which in turn are rotatably supported by bearings 66 and 68 on either end thereof. The end bearings 66 and 68 for shafts 62 and 64 are supported by bearing supports 70, 72, 74 and 76 which are fixed to frame 18.

Still another pair of pinion gears 80 and 82 are mounted on frame 18 for rotation about an axis parallel to the longitudinal axis of lever 12. Gears 80 and 82 are fixed on shafts 84 and 86 which in turn are rotatably mounted in end bearings (not shown). Bearing supports 88 and 90 are fixed to frame 18 and support the shafts 84 and 86. Supports 88 and 90 are similar to supports 70–76.

Figure 14:
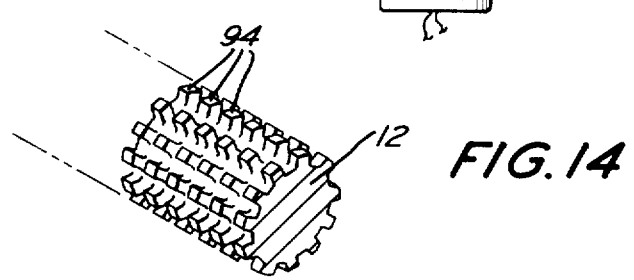
FIGURE 14 is a perspective view of one form of the control lever that may be used with the control mechanism.

As shown in FIGURE 14, the major portion of lever 12 extending from shoulder 92 to the end thereof is provided with a plurality of aligned studs 94. As shown, the studs 94 are aligned in circumferential and longitudinal rows. The studs are equally spaced from each other in both the circumferential and longitudinal direction. Moreover, the distance between each stud is designed to be slightly greater than the space between the teeth on each of the pinion gears described above. As shown in FIGURES 1, 3 and 4, the studs 94 mesh with the teeth 96 on each of the pinion gears so as to drive the same when the lever 12 is moved in the appropriate direction.

The arrangement of the studs 94 on the control lever 12 and their interaction with the pairs of gears 38 and 40, 50 and 52, 58 and 60, and 80 and 82 is such that push-pull motion of the lever 12 will move the studs 94 against the gear teeth 96 and thus rotate gears 38, 40, 58 and 60. At the same time, studs 94 pass between the teeth of gears 50, 52, 80 and 82. Clearly these latter gears remain motionless when a push or pull movement is imparted to the lever 12. If the lever 12 is rotated in the clockwise or counterclockwise direction, the converse action occurs. Gears 50, 52, 80 and 82 are rotated about their respective axes while gears 38, 40, 58 and 60 remain motionless.

In the embodiment described, gears 38, 40 and 50, 52 provide a means for maintaining the position of lever 12 and have no instrument control associated with them. However, those skilled in the art will readily recognize that they can be adapted for such control in accordance with principles described below.

As shown in FIGURE 1, the shaft 84 of gear 80 extends through its bearing and bearing support 88 and is connected to a flexible cable 98. Cable 98 in turn is connected to the shaft 100 of an electronic control 110. Such control can be a potentiometer, rotary switch, or the like. For example, the control 110 could be a well known type that is used to adjust the oscilloscope beam sweep frequency. Normally, the control 110 would be mounted adjacent the front panel of an oscilloscope and a knob fixed to shaft 100. From the foregoing, it should be clear that the shaft 100 of electronic control 110 is rotated simultaneously and proportionally with the rotation of the shaft 84 of gear 80. Those skilled in the art will recognize that flexible cable 98 could be connected to the shaft 86 of gear 82 with similar results. Since gear 80 is driven by clockwise or counterclockwise rotation of lever 12, it is apparent that such motion when applied to the lever through handle 14 permits the operator to control the horizontal sweep frequency.

The shaft 62 of gear 58 extends through support 72 and is coupled to electronic control 112 by the coupler 114. In the illustrated embodiment, control 112 is supported on frame 18 by a bracket 116. However, the shaft 62 could be coupled to control 112 through a flexible cable in the manner described above with respect to control 110. By way of example, electronic control 112 could control the signal amplitude for the oscilloscope. Gears 58 and 60 rotate in direct proportion to the push and pull movements of the control lever 12. Thus, imparting a push or pull movement to lever 12 controls the oscilloscope signal amplitude through electronic control 112.

The shaft 64 of gear 60 is illustrated as being connected to a flexible cable 118. Movement of gear 60 and hence shaft 64 is proportional to the longitudinal displacement of lever 12. If desired, the cable 118 could be connected to a second signal amplitude control when two such signals are being used.

The distal end of control lever 12 is provided with an end plate 120 which cooperates with a strut 31 adjacent the end of frame 18 to prevent reciprocation of the distal end of lever 12 beyond the end of frame 18. Shoulder 92 performs a similar function by striking hemisphere 16 when the lever is reciprocated fully in the other direction. In the embodiment shown in FIGURE 1, the lever 12 is presumed to have been reciprocated fully in the lefthand direction.

The hemisphere 16 is mounted for rotation about a vertical axis by a pair of shafts 122 and 124 which fit into bearings 126 and 128. Bearings 126 and 128 are mounted upon a gimbal ring 130 which extends about the circumference of hemisphere 16.

Shaft 124 passes through bearing 128 and gimbal ring 130. A coupler 132 couples the shaft 124 to an electronic control 134 which is fixed to gimbal 130 by a support bracket 136. By way of example, the electronic control 134 can be used to control the horizontal position of the oscilloscope beam.

Gimbal ring 130 is mounted for rotation about a horizontal axis by a pair of shafts 138 and 140 which fit into bearings 142 and 144. Bearings 142 and 144 are rigidly fixed in brackets 146 and 148 that are connected to the front panel 150 of the oscilloscope or any other convenient part of the instrument chassis. The shaft 140 extends through the bearing 144 and is coupled by coupler 152 to electronic control 154. By way of example, the electronic control 154 can be used to control the vertical position of the oscilloscope beam.

From the foregoing, it should be apparent that the hemisphere 16 and frame 18 connected thereto are gimbal mounted. Thus, combinations of both horizontal and vertical motion can be imparted to the hemisphere 16 and frame 18 which will result in proportional rotation of the shafts 124 and 140. This rotation will be translated to the controls 134 and 154.

From the foregoing, it should be apparent that an operator can control four distinct functions of the oscilloscope through movement of the lever 12. This is done manually simply by moving the handle 14 of lever 12 toward and away from the panel 150, rotating it clockwise or counterclockwise, or moving it vertically, horizontally or in any combination thereof.

Other desirable pairings of oscilloscope functions with lever motion can be accommodated. As indicated above, the oscilloscope is merely an example of an electronic instrument, chosen because it is common and well known. Of course any desired variation of control knob functions for instruments or control panels may be employed with the mechanism 10. Moreover, any number of control mechanisms 10 may be used on a given instrument or control panel depending upon the intended convenience of use, including for example on lever 12 which might control only two functions, another controlling four and still another controlling six in the manner to be described below.

In the foregoing described embodiment, the gears 38, 40 and 50, 52 stabilize and guide the end of control lever 12 adjacent hemisphere 16 in its translational and rotational movements. In FIGURES 5, 6, 7 and 8 means are shown whereby the guide gears 38, 40 and 50, 52 can be replaced with ball bearings in circular races which fit around the circumference of the lever 12.

In providing this type of ball bearing, it must be recognized that the races have to fit snugly around the lever 12 if they are to firmly stabilize it and yet provide the smooth guiding action during its translational and rotational movement. Further complicating this is the fact that the surface of the lever 12 is covered with regularly spaced studs 94 that must engage the control gears 58, 60 and 80, 82. Below is described the novel and unobvious bearing which can firmly position the control lever 12. The advantage of the novel bearing to the control mechanism 10 is that it simplifies the overall construction in that two bearings can be used to replace the four guide gears 38, 40 and 50, 52. One bearing is positioned at the present location of the guide gears and a second bearing is positioned intermediate the gears 58, 60 and 80, 82. Another advantage is that one each of the pairs of control gears 58, 60 and 80, 82 can be eliminated since they are no longer needed to provide support as well as a control function.

Referring now to FIGURES 7 and 8, a first embodiment of a bearing for use of the control lever 12 is illustrated. As shown, the lever 12 with studs 94 on the surface thereof extends through and is concentric with a bearing support 154. The support 154 is recessed at 156 and three ball races 158, 160 and 162 are set within the recess. The races are clamped within the recess 156 by an annular plate bolted to a side face of support 154 by means of threaded fasteners 166 and 168. Each of the races 158–162 supports a plurality of spaced apart ball bearings 170. The ball bearings 170 are retained within the races 158–162 by making the depths of the race greater than the radius of the balls so that the balls protrude from the race a distance less than the radius. Thus, part of the race effectively surrounds the balls and retains them in position.

As indicated above, it is to be a function of the bearing to stabilize the lever 12 as well as provide smooth reciprocatory and rotary motion for the same. Accordingly, it is necessary to arrange the ball bearings 170 and the races 160 in relation to the spacing and bearing surfaces of the studs 94 so as to be certain that at least one out of every three bearings abuts the upper surface of a stud. This is accomplished by meeting the following requirement. The distance between the adjacent ball bearings must be less than the width of the bearing surfaces of the studs 94 protruding from the surface of lever 12. At the same time, the distance between the centers of adjacent ball bearings must be greater than ½ of the gap distance between the surfaces of adjacent studs 94.

If the foregoing relation between the studs 94 and centers of the ball bearings 170 is followed, translation of the lever 12, as for example from left to right in FIGURE 7 will result in the lead stud 94a still being in contact with the bearing 170a when the following stud 94b makes contact with the bearing 170b. The same relationship applies when stud 94c makes contact with ball bearing 170c. In other words, the stud 94b will not yet have broken contact with the bearing 170b. Thus, at least one ball bearing is in contact with the surface of a control lever stud 94 at all times.

Of course, the studs 94 are arranged in circular as well as horizontal rows. The spacing between the centers of adjacent balls in the same circular race then becomes the critical requirement. This requirement is the same as that described above. That is, the distance between the centers of adjacent balls in the same race should be less than the width of the bearing surface of the studs 94 in the same circular row, but greater than ½ of the gap distance between adjacent studs. If this relationship is followed in the circular race, at least one out of every three balls will be in contact during rotary movements of the control lever.

The complete bearing, combining the longitudinal and circular arrangement of ball bearings contains three races. The races are separated from each other by the prescribed distance between the ball bearing centers. The individual balls in each race are also separated from each other by the prescribed distance. In combination then, any possible variation of longitudinal and rotational movement of the control lever 12 will always result in a minimum of at least one adjacent race being in contact with the stud surfaces, and within each race, a minimum of at least one out of every three balls will be in contact with the bearing surfaces of the studs. Since only three balls in a given race need be in contact to securely stabilize a circular control lever, a minimum of nine balls in each of the three races is required.

The bearing races and the individual ball bearings within each race can be grouped together as in FIGURES 7 or 8 or spaced apart as in FIGURES 5 and 6. With respect to FIGURES 5 and 6, the same elements are identified with the same identifying numerals but with 100 added.

In FIGURES 5 and 6, the support 254 retains the races 258, 260 and 262 within the recess 256. The races are clamped by surface 264 and bolts 266 and 268. Each of the races supports the required number of ball bearings 270.

In FIGURES 5 and 6, the ball bearings 270 are spaced apart a good deal farther than those illustrated in FIGURES 7 and 8. However, this does not effect the overall function of the bearings so long as the same relationship between adjacent ball bearings 270 and adjacent studs 94 is retained. In other words, the following ball bearing must make contact with the surface of a following stud before the leading ball bearing loses contact with the leading stud. The difference is that the following stud and following bearing are not the next adjacent ones but may be one after that.

Those skilled in the art will recognize that the number of stud spacing between studs may depend upon the gear ratio necessary to operate the various instrument functions. Thus, it is necessary to establish design guides for determining the minimum number of ball bearings and their spacing for insuring that at least one bearing is always in contact with the surface of a stud. The necessity for assuring contact is fundamental since it is the purpose of the bearings to provide not only smooth displacement of the lever 12 but also to stabilize it during such displacement. Three categories are established under which all dimensions of the lever, stud and stud spacing dimensions may be grouped.

In Category I, the top surface of the studs and the distance between the studs have identical dimensions. When this is the consideration, three ball bearings must be used and these should be spaced so that the center to center distance between bearings is less than the distance across each stud surface and is also greater than ½ the inter-stud distance. Thus, Category I is the same as that described in respect to FIGURES 5, 6, 7 and 8.

In Category II, the distance across the surface of each stud is larger than the space between adjacent studs. Here the design of a bearing is accomplished by selecting a distance between adjacent ball bearing centers which is slightly less than the distance across the bearing surface of each stud, but as close to the stud distance as is practicable. This will enable the use of two bearings, regardless of the actual stud and distance between stud dimensions.

Category III presents a more complicated design approach. Here distance across the stud surfaces is assumed to be less than the distance between adjacent studs. In Category III, the minimum number of ball bearings required to provide stabilization for the control lever depends upon the actual disproportion in size between the stud surfaces and the space between adjacent studs. The design technique is as follows:

The distance between centers of adjacent ball bearings is selected to be slightly less than the distance across the stud surface. This satisfies the first part of the requirement used with respect to Category 1. The second part of the requirement is accomplished by adding as many bearings in addition to the minimum of three as are required to bring the effective distance between studs down to a value where the selected inter-bearing spacing is less than ½ the effective distance between adjacent studs.

The following are examples of the foregoing design technique.

Let it be assumed that the distance across a stud surface is ¼ inch and the inter-stud distance is ¾ of an inch. According to the principles outlined above, the distance between centers of adjacent ball bearings should be slightly less than the distance across the stud surface. One such practical inter-bearing distance would be 3/16 of an inch. The second requirement to be met is that the inter-bearing distance is to be greater than ½ of the distance between adjacent studs. If the inter-bearing distance is to be greater than ½ of the inter-stud distance, then it must be greater than 9/16 of an inch, or conversely, the inter-stud distance must be reduced to less than 9/16 of an inch. In the present case, the inter-stud distance is 12/16 of an inch. To bring the effective inter-stud distance down to the desired spacing of less than 9/16 of an inch, three additional ball bearings, all spaced at 3/16 of an inch, are added. The first two bearings bring the effective inter-stud spacing down to 9/16 of an inch. That is, the additional two bearings spaced apart at 3/16 of an inch add 6/16 of an inch to the bearing length. The third bearing is added to make the effective inter-stud distance less than 6/16 of an inch. This results in a total of six bearings to bring the effective inter-stud distance to 3/16 of an inch. Clearly then the inter-bearing spacing of 3/16 of an inch is less than the stud surface distance of 4/16 of an inch and yet it is also greater than ½ the effective inter-stud distance of 3/16 of an inch. Accordingly the basic precept is fulfilled and one bearing will always be in contact with a stud at all longitudinal positions of the shaft. Moreover, this is accomplished with a minimum number of bearings for this spacing, namely six bearings.

Those skilled in the art will readily recognize the general principles of the foregoing example and be able to follow and apply them as a design concept of different stud surface and inter-stud distances.

Referring now to FIGURES 9 and 10, a modification of the control mechanism 10 is illustrated wherein a fifth and sixth control function can be added. Since it is intended that this modification should supplement the apparatus illustrated in FIGURE 1, like elements are identified by like numerals.

In this embodiment, the control lever 12 extends through the hemisphere 16 which is mounted to the gimbal ring 130 in the manner heretofore described. The front panel 170 of the instrument has a widely spaced opening 172 through which the hemisphere 16 protrudes. Rather than being mounted to the panel 170, hemisphere 16 is supported by bracket 174 and bracket 176 on a sliding screen panel 178.

Screen panel 178 is mounted on the rear side of panel 170 by a pair of bolts 180 and 182 that extend through holes in panel 170 and slots, such as slot 184, in screen panel 178. The diameter of bolts 180 and 182 is approximately equal to the width of slot 184. Ball bearings 186 and 188 are mounted on bolts 180 and 182 intermediate the panel 170 and screen panel 178. Similar ball bearings 190 and 192 are mounted on bolts 180 and 182 intermediate the screen panel 178 and the flared ends of bolts 180 and 182. The bearings 186–192 provide for free sliding relative displacement between panel 170 and screen panel 178 along the longitudinal axis of the slot 184.

From the foregoing, it should be apparent that a new direction and displacement has been added to the entire control mechanism 10. Thus, the mechanism 10 can now be shifted back and forth along the slots 184. Such movement is translated into an electronic control by mounting a rubber wheel on the screen panel 178 by means of a shaft support 196. Wheel 194 extends through slot 184 and the periphery thereof bears against front panel 170. Thus, when the mechanism 10 is shifted along slot 184, the wheel 194 will be caused to rotate by its frictional engagement with panel 170. The shaft 198 of wheel 174 is coupled through a coupler 200 to an electronic control 202.

If desired, the control 202 can be used to vary in stepwise fashion the multiplier control for an oscilloscope.

The width of opening 172 in the front panel 170 should be great enough to accommodate the amount of lateral movement of hemisphere 16 to provide for the full range of electronic control. Similarly, the length of the slots 184 should be long enough to accommodate for the full range of rotation of the electronic control 202.

A system similar to that illustrate in FIGURES 9 and 10 can be used to vertically displace the control mechanism 10. This is accomplished by adding a second screen panel with vertical slots mounted on the screen panel 178. The mechanism 10 is then mounted on the second screen panel. Thus, the second screen panel can move in a vertical direction relative to the first screen panel 178 and front panel 170 and the first screen panel can move as heretofore described in a horizontal direction relative to the front panel 170 and second screen panel.

The foregoing modification of the mechanism 10 is most useful for stepwise functions, since this modification is more stable than the continuously variable functions. If desired, detents or frictional stops can be provided in the slots or panels.

Referring now to FIGURES 11, 12 and 13, there is shown another embodiment of the present invention. This latter embodiment modifies the control mechanism so that it can provide stepwise changes of range, and continuous variation of the control function within each range.

Certain electronic instrument functions are controlled by two control knobs, one for selecting a given range and the other for continuous variation of the function within that range. For example, in most electronic instruments involving amplification of electronic signal, one knob operates a rotary switch which selects one of a number of different amplification ranges. Typical amplification ranges may be 0–10 times $f(x)$, 10–100 times $f(x)$, 100–1000 times $f(x)$ and 1000–10,000 times $f(x)$. After an appropriate range is selected, the operator rotates another knob which is usually a variable resistor or potentiometer.

This permits continuous adjustment of the amplification throughout the selected range.

The advantage of the present modification of the control mechanism is that both the range switch and the continuous refine control can be combined and operated by a single motion, such as push-pull of the control lever. The apparatus for accomplishing this is illustrated in FIGURES 11, 12 and 13.

A control lever 12 extends through the gimbal mounted hemisphere 16 and is supported within the cross-braced frame 210 by a pair of bearings 212 and 214 similar to the bearings described above. The lever 12 is provided with a plurality of circumferentially and longitudinally aligned studs 94 in accordance with the principles heretofore described. Hemisphere 16 is supported on the frame 210 by cross-braces 216 and 218.

Frame 210 supports in journal bearing 220 and 221 the pinion gear 222. Gear 222 rotates about an axis normal to the longitudinal axis of lever 12. Such rotation is imparted by meshing engagement of the studs 94 on lever 12 and the teeth of gear 222.

A pair of bearing supports 224 and 226 extend laterally from frame 210 and support the shaft 228 of gear 230. Gear 230 rotates about an axis parallel to the longitudinal axis of lever 12 and rotates in response to clockwise or counterclockwise rotation of the lever.

The shaft of gear 222 is connected by a flexible cable 232 to an electronic control. Similarly, the shaft 228 of gear 230 is connected by a cable 234 to a second electronic control. A plurality of spaced apart switches 236, 238, 240 and 242 are mounted upon frame 210 so that their toggle levers extend down to a point slightly above the lever 12. Switches 236–242 comprise range switches connected to the electronic instrument so that when their toggles are moved from one position to another, the range of the instrument changes accordingly. A flange 244 is provided on the end of lever 12 for so changing the position of the switch toggles.

The switches 236–242 can be spaced apart so that displacement of the flange 244 from one switch to the next will result in a 360° rotation of the gear 222 hence a continuous full range variation of the electronic control to which the gear is connected. Thus, after each 360° rotation of the gear 222, the switch tripping flange 244 will activate one of the switches 236–242 to shift the electronic function being controlled into the next range. The switches are pushed or pulled into the proper position by the progression of the flange 244.

For proper operation, the switches are spaced apart a distance equal to the circumference of gear 222. Thus, if the diameter of gear 222 is ½ inch, the circumference equals $\pi d$ or approximately 1½ inches. Thus, the switches should be located approximately every 1½ inches along the frame 210.

Although the control mechanism has been described with respect to controlling an oscilloscope, those skilled in the art will readily recognize that it is completely adaptable for operating many types of electronic instruments. In general, the control mechanism combines six different functions in a single manually operated device. The lever can be raised or lowered, moved left or right or any combination thereof; the lever can be moved in or out relative to the front panel; the lever can be rotated clockwise or counterclockwise; and the entire mechanism can be shifted vertically or horizontally. If desired, a switch can be placed on the end of lever 12 for controlling the power on-off, or a rotatable knob can be substituted for controlling oscilloscope beam intensity.

The present invention may be embodied in other specific forms without departing from the spirit or essential attributes thereof and, accordingly, reference should be made to the appended claims, rather than to the foregoing specification as indicating the scope of the invention.

I claim:

1. A control mechanism for unifying multiple control functions comprising a control lever, means supporting said lever for rotation about its longitudinal axis and for reciprocatory displacement along its axis independent of one another so that it may rotate without reciprocating and may reciprocate without rotating, means supporting said lever for translation about axes normal to its longitudinal axis, means for converting said reciprocatory and rotary displacement into proportional control functions, said last-mentioned means including first rotary means mounted for rotation about an axis parallel to the longitudinal axis of said lever, second rotary means mounted for rotation about an axis normal to the longitudinal axis of said lever, said first and second rotary means being in engagement with said lever and being rotationally responsive to rotary reciprocatory displacement of said lever, and means for converting said translation about said normal axes into proportional control functions.

2. A control mechanism in accordance with claim 1 wherein circumferentially and longitudinally aligned studs project from said lever for engaging said rotary means, and bearing means for supporting said studded lever, said bearing means including concentric bearing races supporting ball bearings against said studs, and the space between centers of adjacent ball bearings being less than the width of the surface of each stud but greater than ½ the gap distance between bearing surfaces.

3. A control mechanism for unifying multiple control functions comprising a control lever, means supporting said lever for rotation about its longitudinal axis and for reciprocatory displacement along its axis independent of one another so that it may rotate without reciprocating and may reciprocate without rotating, means supporting said lever for translation about axes normal to its longitudinal axis, means for converting said reciprocatory and rotary displacement into proportional control functions, and means for converting said translation about said normal axes into proportional control functions, said means for supporting said lever for translation about axis normal to the longitudinal axis of said lever including a gimbal mount, said means for converting said translation into a control function including means connected to the pivot supports of said gimbal mount, said last-mentioned means being responsive to rotation of said pivots during translation of said lever.

4. A control mechanism for unifying multiple control functions comprising a control lever, means supporting said lever for rotation about its longitudinal axis and for reciprocatory displacement along its axis independent of one another so that it may rotate without reciprocating and may reciprocate without rotating, means supporting said lever for translation about axes normal to its longitudinal axis, means for converting said translation into proportional control functions, means for converting said reciprocatory and rotary displacement into proportional control functions, said last-mentioned means including at least one pinion gear mounted for rotation about an axis parallel to the longitudinal axis of said lever, at least one pinion gear mounted for rotation about an axis normal to the longitudinal axis of said lever, circumferentially and longitudinally aligned studs projecting from said lever, said studs being in meshing engagement with said pinion gears for rotating the same, said means for supporting said lever for translation about axes normal to the longitudinal axis of said lever comprising a gimbal mount, and said means for converting said translation into a control function comprising means connected to pivot supports for said gimbal mount, said last-mentioned means being responsive to rotation of said pivots.

5. A control mechanism in accordance with claim 4 wherein said lever is mounted for rotary and reciprocatory motion by ball bearing means, said ball bearing means including a plurality of adjacent concentric bearing races supporting ball bearings against the outer surfaces of said studs, and the space between centers of adjacent longitudinal and circumferential ball bearings being less than the width of the surface of each stud but greater than ½ the gap distance between the bearing surfaces.

6. A control mechanism for unifying multiple control functions comprising a control lever, said lever having longitudinally and circumferentially spaced parallel rows of studs on its outer periphery, means supporting said lever for both rotary and reciprocatory displacement about and along its longitudinal axis, and means for converting said rotary and reciprocatory displacement into proportional control functions.

7. A control mechanism in accordance with claim 6 including means for supporting said mechanism for displacement along horizontal and vertical axes normal to the longitudinal axis of said lever, and means for converting said horizontal and vertical displacement into a proportional control function.

8. A control mechanism for unifying multiple control functions comprising a control lever, means supporting said lever for rotation about its longitudinal axis and for reciprocatory displacement along its axis independent of one another so that it may rotate without reciprocating and may reciprocate without rotating, means supporting said lever for translation about axes normal to its longitudinal axis, means for converting said reciprocatory and rotary displacement into proportional control functions, means for converting said translation about said normal axes into proportional control functions, said means for supporting said lever including a frame, spaced control function means supported by said frame, and means extending from said lever for engagement with said control function means upon displacement of said lever to operate said control function means, and at least one of said converting means being mounted for rotation about an axis perpendicular to the longitudinal axis of said lever.

9. A control mechanism for unifying multiple control functions comprising a control lever, a frame, means supporting said lever for rotation about its longitudinal axis and for reciprocatory displacement along its axis independent of one another so that it may rotate without reciprocating and may reciprocate without rotating relative to said frame, said supporting means including a gimbal mount supporting said frame, means supporting said lever on said frame for translation about axes normal to the longitudinal axis of the lever, means for converting said reciprocatory and rotary displacement into proportional control functions, and means for converting said translation about said normal axes into proportional control functions.

References Cited

UNITED STATES PATENTS

| 3,266,523 | 8/1966 | Stevens | 74—471 |
| 2,322,455 | 6/1943 | Klemperer | 33—49 |
| 2,379,778 | 7/1945 | Allen. | |
| 2,912,873 | 11/1959 | Little | 74—471 |

HALL C. COE, *Primary Examiner.*